(12) United States Patent
Lee

(10) Patent No.: US 10,701,619 B2
(45) Date of Patent: Jun. 30, 2020

(54) METHOD AND APPARATUS FOR CONTROLLING AN ACCESS OF A TERMINAL IN A WIRELESS COMMUNICATION SYSTEM

(71) Applicant: LG ELECTRONICS INC., Seoul (KR)

(72) Inventor: Kidong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/773,148

(22) PCT Filed: Nov. 3, 2016

(86) PCT No.: PCT/KR2016/012580
§ 371 (c)(1),
(2) Date: May 2, 2018

(87) PCT Pub. No.: WO2017/078424
PCT Pub. Date: May 11, 2017

(65) Prior Publication Data
US 2018/0324675 A1 Nov. 8, 2018

Related U.S. Application Data

(60) Provisional application No. 62/363,806, filed on Jul. 18, 2016, provisional application No. 62/250,431, filed on Nov. 3, 2015.

(51) Int. Cl.
*H04W 48/06* (2009.01)
*H04W 48/08* (2009.01)
(Continued)

(52) U.S. Cl.
CPC ....... *H04W 48/06* (2013.01); *H04W 28/0289* (2013.01); *H04W 48/02* (2013.01); *H04W 48/08* (2013.01)

(58) Field of Classification Search
None
See application file for complete search history.

(56) References Cited

U.S. PATENT DOCUMENTS

2014/0010180 A1  1/2014 Lee et al.
2015/0215845 A1  7/2015 Pinheiro et al.

FOREIGN PATENT DOCUMENTS

WO   WO-2016118104 A1 * 7/2016 ........ H04W 28/0289

OTHER PUBLICATIONS

LG Electronics Inc., "RAN Aspects of Application Specific Congestion Control for Data Communication", RP-151275, 3GPP TSG RAN meeting #69, Phoenix, USA, Sep. 14-16, 2015, see section 2.1.1.

(Continued)

*Primary Examiner* — Kouroush Mohebbi
(74) *Attorney, Agent, or Firm* — Dentons US LLP

(57) ABSTRACT

An embodiment of the present invention provides a method for controlling an access of a terminal in a wireless communication system. The method performed by the terminal comprises receiving, from a base station, system information comprising Application specific Congestion control for Data Communication (ACDC) barring information related to whether or not to allow an access of a specific ACDC category to which at least one application belongs; storing a priority level of an ACDC category of a first access request; checking whether there is a need of a second access request; checking whether the ACDC timer is running; and comparing the priority level of the ACDC category of the first access request with a priority level of an ACDC category of the second access request if the ACDC timer is running due to the stored priority level that caused the ACDC timer to start.

15 Claims, 10 Drawing Sheets

(51) Int. Cl.
  *H04W 48/02* (2009.01)
  *H04W 28/02* (2009.01)

(56) References Cited

OTHER PUBLICATIONS

LG Electronics Inc., "Some clarification in the statement of honouring ACDC Category", S1-141163, 3GPP TSG-SA WG1 Meeting #66, Sapporo, Japan, May 12-16, 2014, see section 6.1.1 Granularity of Control.
NTT Docomo et al., "Number of ACDC categories", S1-143117, 3GPP TSG-SA WG1 Meeting #67, Sophia-Antipolis, France, Aug. 18-22, 2014, see sections 4.3.5.1, 4.3.5.2.

* cited by examiner

[Figure 1]
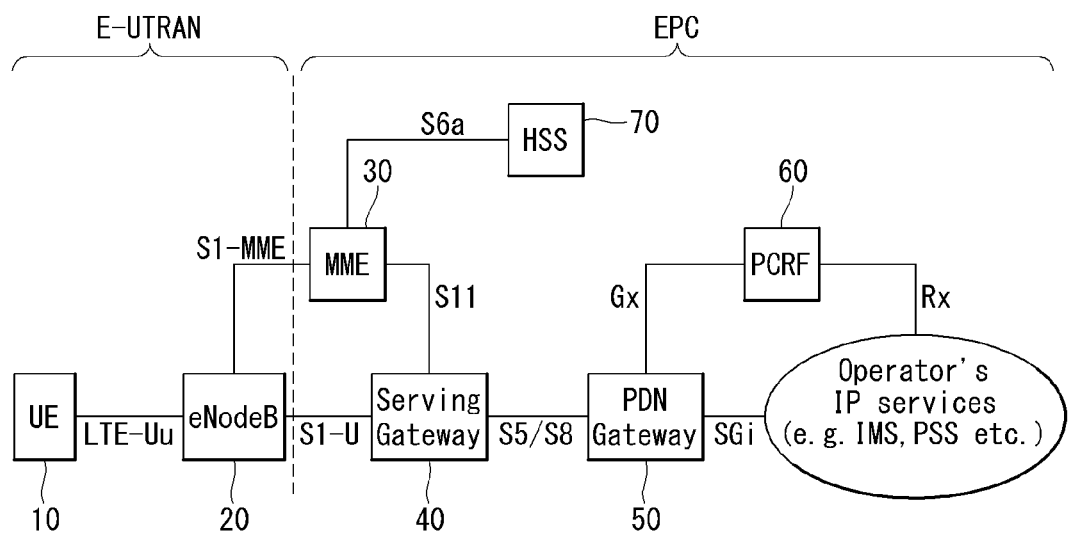

[Figure 2]
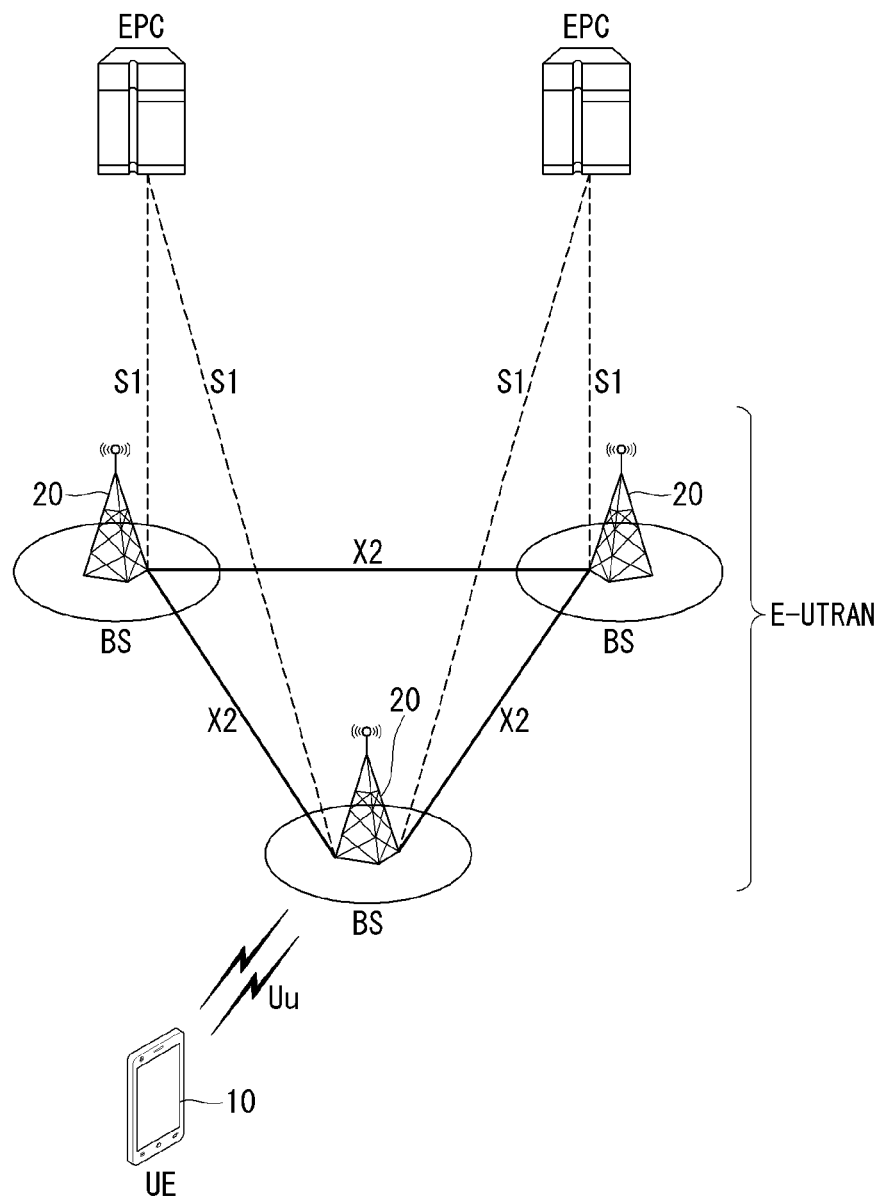

[Figure 3]
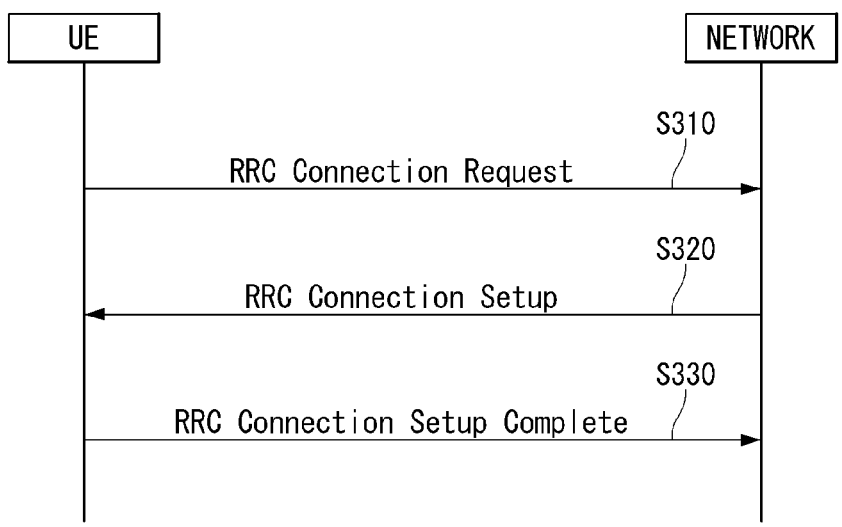
[Figure 4]
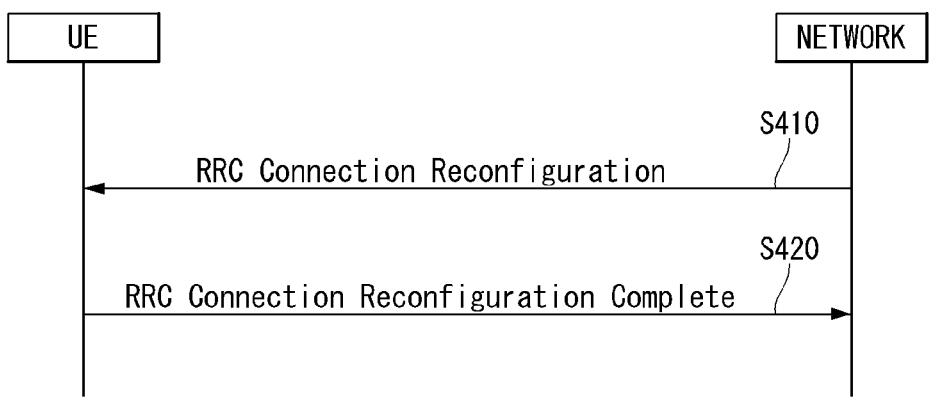

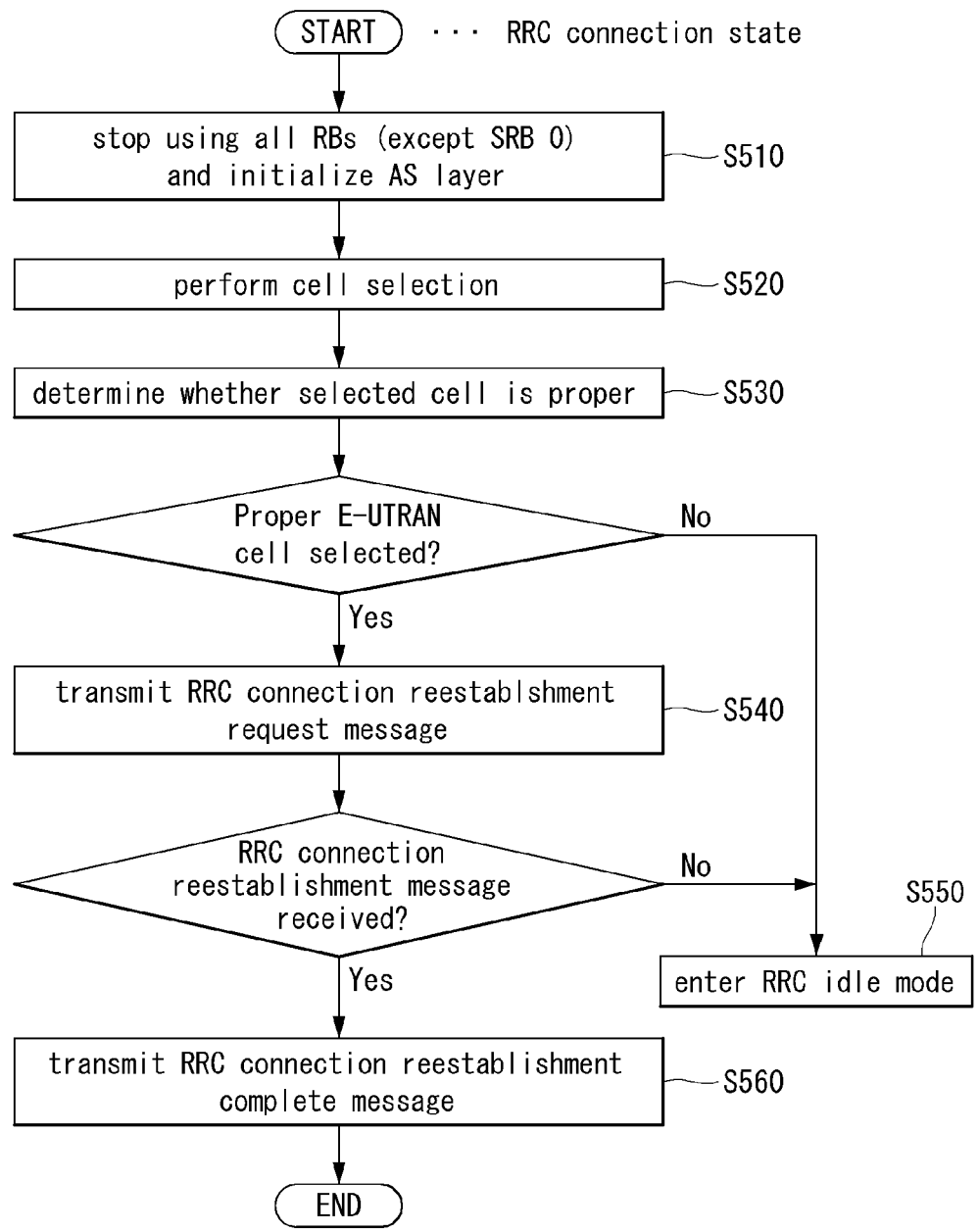
[Figure 5]

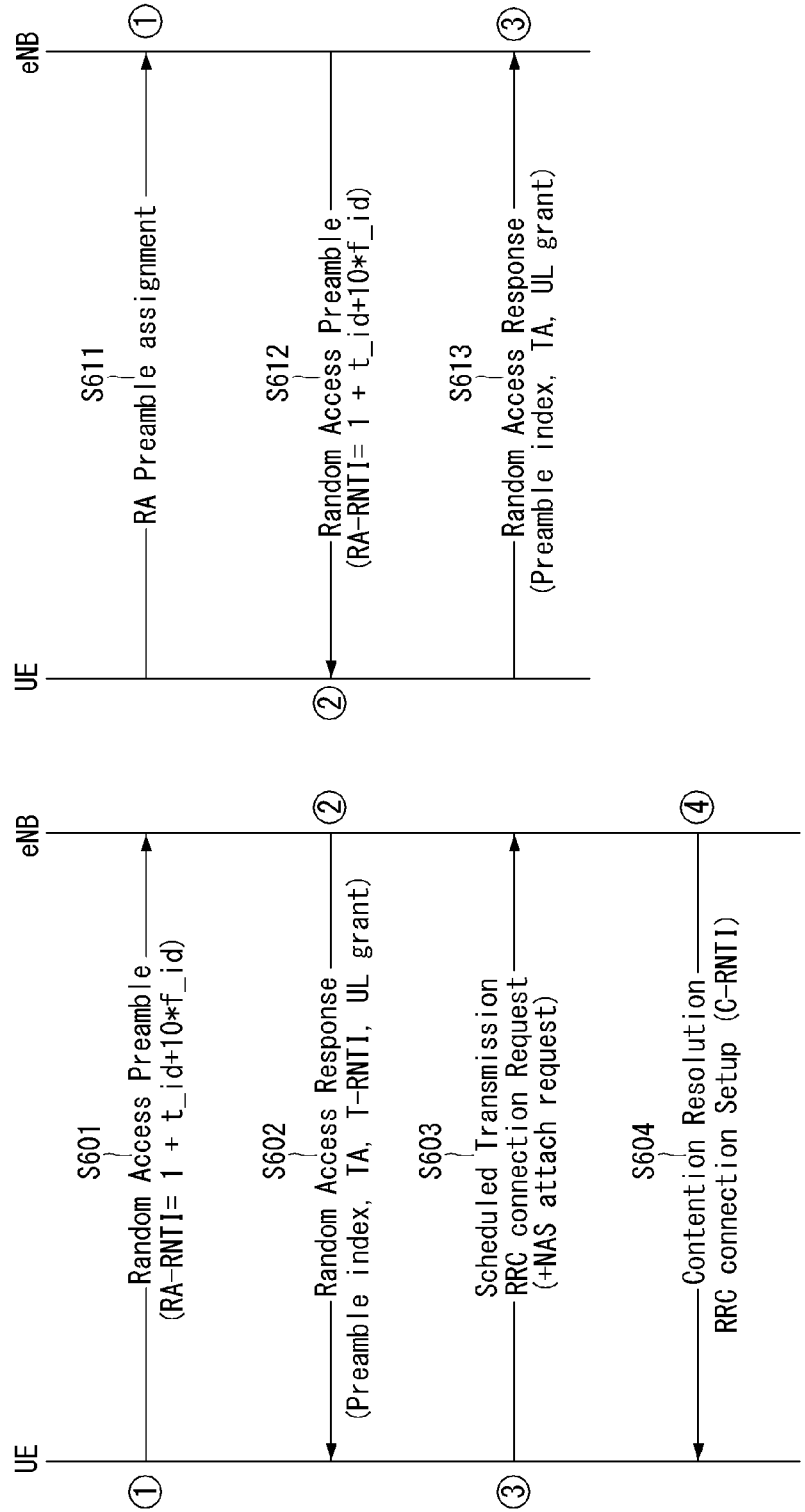

[Figure 7]
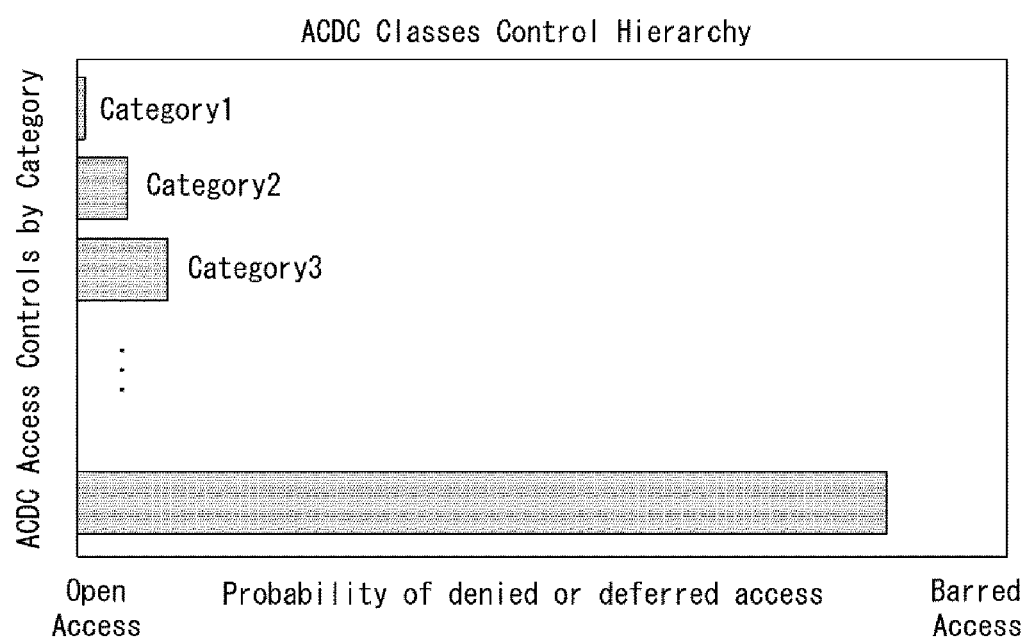

[Figure 8a]
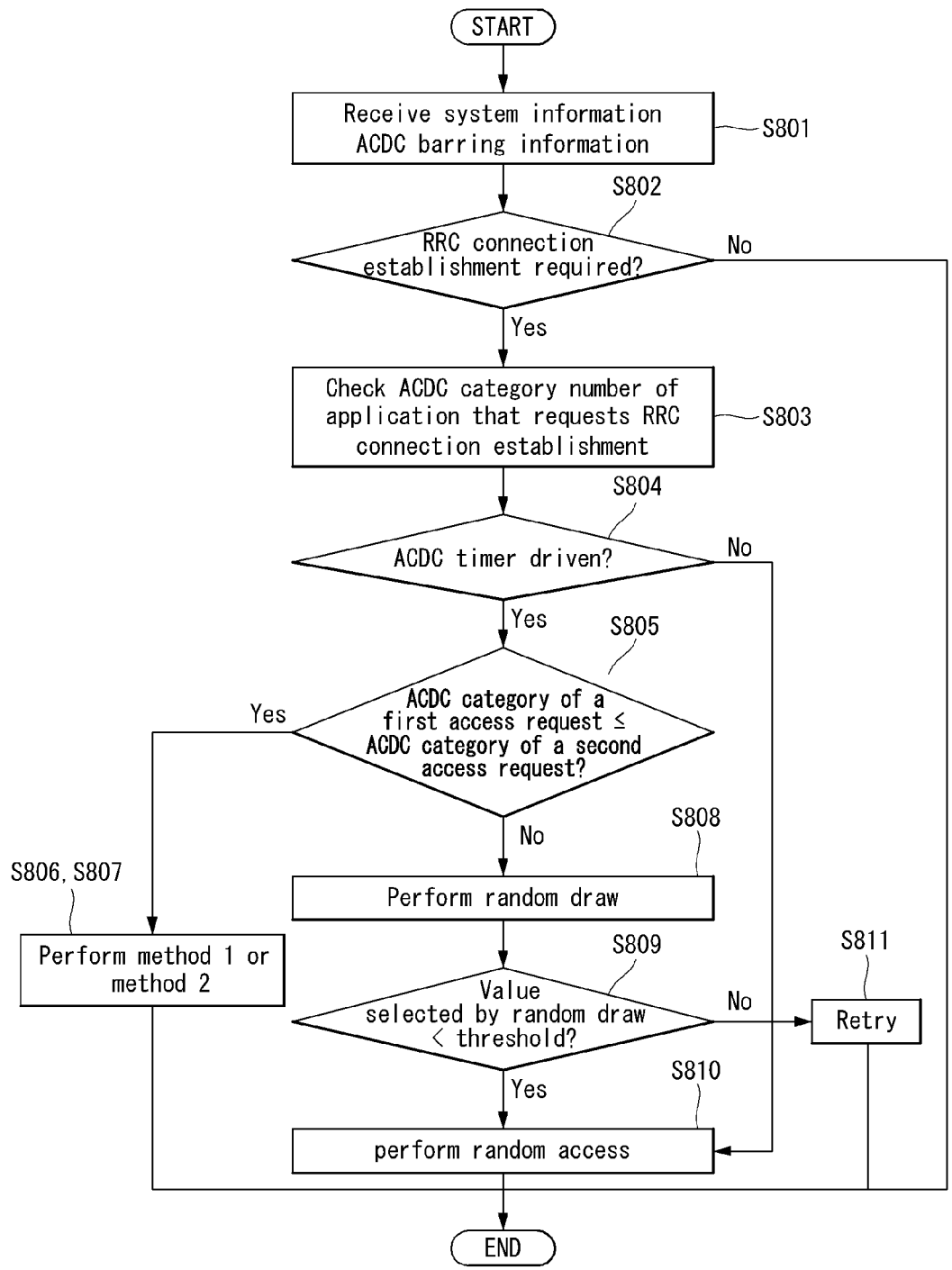

[Figure 8b]
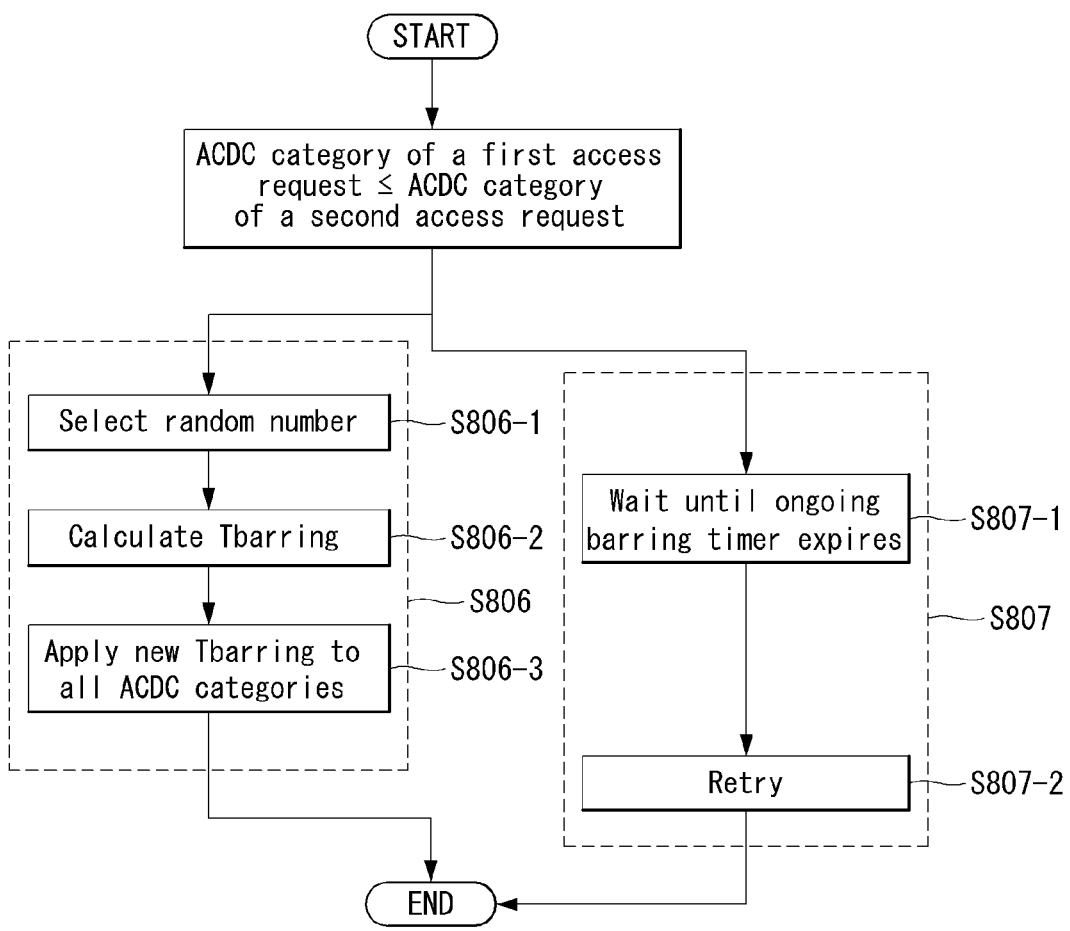

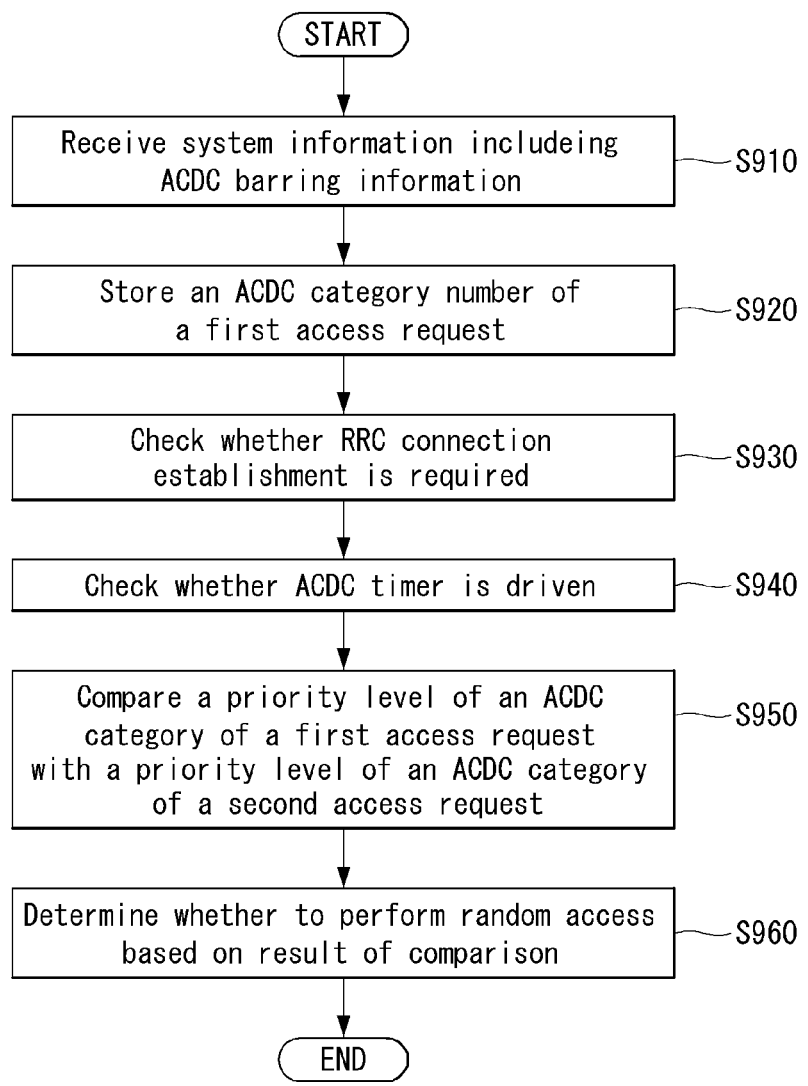

[Figure 10]
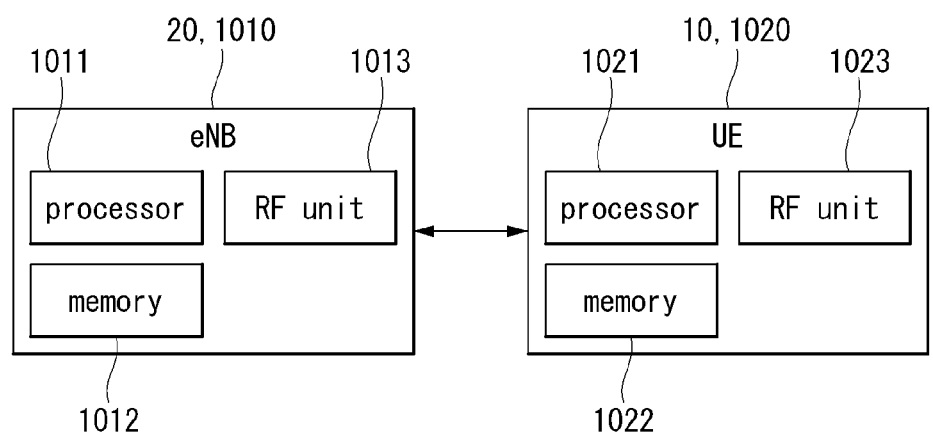

METHOD AND APPARATUS FOR CONTROLLING AN ACCESS OF A TERMINAL IN A WIRELESS COMMUNICATION SYSTEM

CROSS-REFERENCE TO RELATED APPLICATIONS

This application is the National Stage filing under 35 U.S.C. 371 of International Application No. PCT/KR2016/012580, filed on Nov. 3, 2016, which claims the benefit of U.S. Provisional Application No. 62/250,431, filed on Nov. 3, 2015, and U.S. Provisional Application No. 62/363,806, filed on Jul. 18, 2016, the contents of which are all hereby incorporated by reference herein in their entirety.

TECHNICAL FIELD

This specification relates to a method and apparatus for controlling an access of a terminal.

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

SUMMARY OF INVENTION

Technical Problem

This disclosure aims to provide a method for controlling an access of a terminal per ACDC category using a single barring timer.

Objects to be achieved in this specification are not limited to the aforementioned advantages, and those skilled in the art to which the present invention pertains may evidently understand other objects from the following description.

Technical Solution

An embodiment of the present invention provides a method for controlling an access of a terminal in a wireless communication system.

The method performed by the terminal comprises receiving, from a base station, system information comprising Application specific Congestion control for Data Communication (ACDC) barring information related to whether or not to allow an access of a specific ACDC category to which at least one application belongs; storing a priority level of an ACDC category of a first access request, wherein the first access request is an access request that caused an ACDC timer to be triggered when the ACDC timer begins to run; checking whether there is a need of a second access request, wherein the second access request is an access request for establishing a RRC(Radio Resource Control) connection caused by a specific application; checking whether the ACDC timer is running; and comparing the priority level of the ACDC category of the first access request with the priority level of the ACDC category of the second access request if the ACDC timer is running due to the stored priority level that caused the ACDC timer to start, wherein the priority level of the ACDC category of the first access request indicates an ACDC category number which has caused the ACDC timer to start, and the priority level of the ACDC category of the second access request indicates an ACDC category number related to the second access request.

Furthermore, according to an embodiment of the present invention, the ACDC barring information comprises at least one of a barring rate parameter or a barring time parameter.

Furthermore, according to an embodiment of the present invention, the method further comprises checking the priority level of the ACDC category of the second access request if there is the need of the second access request.

Furthermore, according to an embodiment of the present invention, if the priority level of the ACDC category of the second access request is higher than the priority level of the ACDC category of the first access request, the method further comprises performing random draw for barring probability; and comparing the drawn value and the barring rate parameter included in the ACDC barring information.

Furthermore, according to an embodiment of the present invention, the method further comprises performing a random access procedure with the base station if the drawn random value is smaller than the barring rate parameter value.

Furthermore, according to an embodiment of the present invention, the access of the terminal is barred if the randomly drawn value is a larger than the barring rate parameter value.

Furthermore, according to an embodiment of the present invention, the method further comprises renewing the ACDC timer with a new barring time, or waiting until the ACDC timer expires.

Furthermore, according to an embodiment of the present invention, the priority level of the ACDC category of the second access request is lower than the priority level of the ACDC category of the first access request, the method further comprises waiting until the ACDC timer expires, or renewing the ACDC timer.

Furthermore, according to an embodiment of the present invention, the system information is a System Information Block (SIB) 2.

Furthermore, an embodiment of the present invention provides a terminal for controlling an access in a wireless communication system.

The terminal comprises a radio frequency (RF) unit for transceiving a radio signal; and a processor functionally connected to the RF unit, wherein the processor is configured to perform: receiving, from a base station, system information comprising ACDC (Application Specific Congestion control for Data Communication) barring information related to whether or not to allow an access of a specific ACDC category to which at least one application belongs; storing a priority level of an ACDC category of a first access request, wherein the first access request is an access request that caused an ACDC timer to be triggered when the ACDC timer begins to run; checking whether there is a need of a second access request, wherein the second access request is an access request for establishing a RRC(Radio Resource Control) connection caused by a specific application; checking whether the ACDC timer is running; and comparing the priority level of the ACDC category of the first access request with the priority level of the ACDC category of the second access request if the ACDC timer is running due to the stored priority level that caused the ACDC timer to start, wherein the priority level of the ACDC category of the first access request indicates an ACDC category number which has caused the ACDC timer to start, and the priority level of the ACDC category of the second access request indicates an ACDC category number related to the second access request.

Advantageous Effects

This disclosure has an advantage in that a control for an access of a terminal can be performed per ACDC category by considering a priority of the ACDC category.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention can be applied.

FIG. 2 illustrates a wireless communication system to which the present invention is applied.

FIG. 3 is a flowchart showing an RRC connection establishment procedure to which the present invention can be applied.

FIG. 4 is a flowchart showing an RRC connection reconfiguration procedure to which the present invention can be applied.

FIG. 5 is a view illustrating an example RRC connection reestablishment procedure to which the present invention can be applied.

FIGS. 6a and 6b illustrate one example of a random access procedure in the LTE system.

FIG. 7 shows an example of an ACDC classes control hierarchy.

FIG. 8 is a diagram showing an example of an ACDC handling method, which is proposed according to an embodiment of the present invention.

FIG. 9 is a diagram showing another example of an ACDC handling method, which is proposed according to an embodiment of the present invention.

FIG. 10 is a block diagram illustrating the inside of a base station and a terminal in which methods as propose herein can be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB or Master eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 is a view illustrating an Evolved Packet System which is associated with the Long Term Evolution (LTE) system to which the present invention can be applied. The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 is a flowchart showing an RRC connection establishment procedure to which the present invention can be applied.

A UE sends to a network an RRC connection request message for requesting an RRC connection (step S310). The network sends an RRC connection setup message in response to the RRC connection request (step S320). After receiving the RRC connection setup message, the UE enters an RRC connection mode.

The UE sends to the network an RRC connection setup complete message used to confirm successful completion of the RRC connection establishment (step S330).

FIG. 4 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S410). In response to the RRC connection reconfiguration, the UE sends to the network an RRC connection reconfiguration complete message used to confirm successful completion of the RRC connection reconfiguration (step S420).

FIG. 5 is a view illustrating an example RRC connection reestablishment procedure to which the present invention can be applied.

Referring to FIG. 5, the terminal stops using all the radio bearers configured except for SRB 0 (Signaling Radio Bearer #0) and initializes various sub-layers of the AS (Access Stratum) (S510). Further, the terminal sets each sub-layer and physical layer as a default configuration. During such process, the terminal maintains the RRC connection state.

The terminal performs a cell selection procedure for performing the RRC connection reestablishment procedure (S520). During the RRC connection reestablishment procedure, the cell selection procedure may be performed like a cell selection procedure performed by the terminal in RRC idle mode even when the terminal maintains the RRC connection state.

After performing the cell selection procedure, the terminal identifies system information of a corresponding cell to determine whether the corresponding cell is a proper cell (S530). In case the selected cell is a proper E-UTRAN cell, the terminal sends a RRC connection reestablishment request message to the corresponding cell (S540).

Meanwhile in case the cell selected through the cell selection procedure for performing the RRC connection reestablishment procedure is a cell using other RAT than E-UTRAN, the terminal stops the RRC connection reestablishment procedure and enters the RRC idle mode (S550).

The terminal may be implemented so that the cell selection procedure and identifying whether the cell is proper through receiving the system information of the selected cell are complete within a limited time. To that end, the terminal may run a timer as the RRC connection reestablishment procedure is initiated. The timer may pause when the terminal is determined to have selected a proper cell. In case the timer expires, the terminal considers the RRC connection reestablishment procedure as failing and may enter the RRC idle mode. This timer is hereinafter referred to as a radio link failure timer. In LTE spec. TS 36.331, a timer named T311 may be utilized as the radio link failure timer. The terminal may obtain setting values of the timer from the system information of a serving cell.

When receiving the RRC connection reestablishment request message from the terminal and accepting the request, the cell sends a RRC connection reestablishment message to the terminal.

When receiving the RRC connection reestablishment message from the cell, the terminal reconfigures a PDCP sub-layer and an RLF sub-layer on SRB1. Further, the terminal recalculates various key values relating to security configuration and reconfigures the PDCP sub-layer responsible for security with the newly calculated security key values.

By doing so, SRB 1 is opened between the terminal and the cell so that RRC control messages may be communicated. The terminal completes resumption of SRB1 and sends to the cell an RRC connection reestablishment complete message indicating the RRC connection reestablishment procedure has been complete (S560).

In contrast, when receiving the RRC connection reestablishment request message from the terminal and not accepting the request, the cell sends a RRC connection reestablishment reject message to the terminal.

If the RRC connection reestablishment procedure is successfully performed, the cell and the terminal perform a RRC connection reestablishment procedure. By doing so, the terminal restores to the state before the RRC connection reestablishment procedure is performed and maximally assures service continuity.

Random Access Channel (RACH) Procedure

FIG. 6a and FIG. 6b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 6*a* illustrates one example of a contention-based random access procedure, and FIG. 6*b* illustrates one example of a non-contention based random access procedure.

First, the contention-based random access procedure will be described with reference to FIG. 6*a*.

The UE receives information about random access from the eNB through system information and stores the received information. Afterwards, in case random access is needed, the UE transmits a random access preamble (which is also called a message 1) to the eNB S601.

If the eNB receives a random access preamble from the UE, the eNB transmits a random access response message (which is also called a message 2) to the UE S602. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S603. At this time, uplink transmission may be described as scheduled transmission.

After receiving the uplink transmission from the UE, the eNB transmits a message for contention resolution (which is also called a message 4) to the UE through a downlink shared channel (DL-SCH) S604.

Next, a non-contention based random access procedure will be described with reference to FIG. 6B.

Before the UE transmits a random access preamble, the eNB allocates a non-contention random access preamble to the UE S611.

The non-contention random access preamble can be allocated through a handover command or dedicated signaling such as signaling through the PDCCH. In case non-contention random access preamble is allocated to the UE, the UE transmits the allocated non-contention random access preamble to the eNB S612.

Afterwards, similarly to the S602 step of the contention-based random access procedure, the UE can transmit a random access response (which is also called a message 2) to the UE S613.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

ACDC (Application Specific Congestion Control for Data Communication)

UEs on which user can easily download applications from web sites are rapidly increasing in the world and a wide variety of applications are constantly created and installed on the UEs.

Specific applications can (intentionally or unintentionally) cause congestion over RAN/CN.

While network is congested, it is not desirable to allow these applications to access the network in order to protect the network resources.

Several SDOs identified key issues related to network inefficiencies caused by such UEs and by the variety of applications.

On the other hand, for example, after the severe earthquake on Mar. 11, 2011, the packet based communication applications that users can invoke to confirm the safety of their relatives are recognized as important applications (e.g. Disaster Message Board (DMB) service, Disaster voice messaging service) when disaster occurs.

Therefore, the government strongly expects operators to provide the connectivity at least for such services even when the network is highly congested, while other services are barred to free up the resources for important services.

The intent of ACDC is to apply access controls in a less indiscriminate way compared to ACB (Access Class Barring).

Whereas ACB applies equally on all ordinary UEs, regardless of the purpose of an access attempt from a UE, ACDC groups applications in categories of importance, and applies access controls to lesser categories first, sparing more important applications from denial or deferral of access until and unless level of congestion is severe enough that they must also be affected.

Hereinafter, an ACDC is described in detail.

Application specific Congestion control for Data Communication (ACDC) is an access control mechanism for the operator to allow/prevent new access attempts from particular, operator-identified applications in the UE in idle mode.

ACDC does not apply to UEs in connected mode.

The network can prevent/mitigate overload of the access network and/or the core network.

Below are requirements of the ACDC.

- This feature shall be applicable to UTRAN and E-UTRAN.
- This feature shall be applicable to UEs thin idle mode only at are not a member of one or more of Access Classes 11 to 15.
- The home network shall be able to configure a UE with at least four ACDC categories to each of which particular, operator-identified applications are associated.
- Provisioning of the ACDC categories in the UE is the responsibility of the home network, and the categorization is outside the scope of 3GPP.
- A mechanism needs to be provided that enables the UE to verify that the provisioning of the configuration originates from a trusted source.
- The serving network shall be able to broadcast, in one or more areas of the RAN, control information, indicating barring information per each ACDC category, and whether a roaming UE shall be subject to ACDC control.
- The UE shall be able to control whether or not an access attempt for a certain application is allowed, based on this broadcast barring information and the configuration of ACDC categories in the UE.

The serving network shall be able to simultaneously indicate ACDC with other forms of access control.

When both ACDC and ACB controls are indicated, ACDC shall override ACB.

In the case of multiple core networks sharing the same access network, the access network shall be able to apply ACDC for the different core networks individually. For the mitigation of congestion in a shared RAN, barring rates should be set equal for all Participating Operators.

In the following specification, an ACDC Category is described in detail.

When configuring the UE with categories of applications, the home network shall proceed as follows:

Applications whose use is expected to be restricted the least shall be assigned the highest ACDC category; and Applications whose use is expected to be restricted more than applications in the highest category shall be assigned the second-to-highest ACDC category, and so on; and Applications whose use is expected to be restricted the most shall either be assigned the lowest ACDC category, or not be categorised at all.

For a UE with ACDC categories configured, the applications on the UE that are not assigned to any ACDC category shall be treated by the UE as part of the lowest ACDC category broadcast by the serving network. If the operator requires differentiation with respect to these uncategorized applications, the operator should avoid assigning applications to the lowest ACDC category. When applying ACDC, the serving network broadcasts barring information starting from the highest to the lowest ACDC category.

The home network and the serving network may use different categorisation. The serving network decides if ACDC applies to roaming UEs.

The number of ACDC categories in the UE may not be the same as the number of ACDC categories broadcast by the serving network. This may happen, e.g. when the UE is roaming and the number of categories broadcast by the serving network is different from the home network. Therefore the following rules shall apply:

If the serving network broadcasts more ACDC categories than the UE's configuration, the UE shall use barring information for the matching ACDC category, and shall bar uncategorised applications using the barring information for the lowest category broadcast by the serving network, and shall ignore barring information for unmatched categories.

If the serving network broadcasts barring information for fewer ACDC categories than the UE's configuration, the UE shall use barring information for the matching ACDC category and shall bar other applications using the barring information for the lowest category broadcast by the serving network.

A matching ACDC category is an ACDC category for which barring information is broadcast by the serving network and that has the same rank as the rank of a configured ACDC category in the UE.

An unmatched ACDC category is either an ACDC category for which barring information is broadcast by the serving network but with no corresponding ACDC category configured in the UE, or an ACDC category configured in the UE but with no corresponding barring information broadcast by the serving network.

Use Case: Roaming Compatibility when ACDC Categorization is Honoured in Roaming UEs In ACDC it is necessary to group mobile originated applications into access categories (hereafter called "ACDC categories"), so that each category is independently controlled in terms of ability to permit network access as the application is started in the UE (usually, but not always, by user action to launch an application). Grouping into categories is necessitated because there are too many mobile applications to be each individually controlled.

Each operator should have flexibility to independently create ACDC categories by provisioning them into UEs it activates on its system. This brings into question ACDC roaming compatibility. This use case addresses the question on how ACDC network controls implemented by VPLMN may apply to a roaming UE, if so permitted by the VPLMN, even though ACDC categorization in the roaming UE may be different than such categorization in non-roaming UEs.

Pre-Conditions

Operator Z UEs have been provisioned by operator Z by creating N ACDC categories in the following fashion.

TABLE 1

| Operator Z ACDC Category | Applications | Notes |
| --- | --- | --- |
| 1 | DMB | DMB (Disaster Message Board) is high priority point-to-point messaging service enabled by the operator in situations of natural or other kind of disaster, allowing friends and family to exchange messages even when network is highly congested. A high level DMB description can be found in TR 22.805 (UPCON Technical Report) [5]. |
| 2 | Voice Services | E.g., IMS with audio component only |
| 3 | Non-GBR TCP-based data services | |
| 4 | Point-to-point video services | |
| ... | ... | |
| N | All remaining services | |

Analogously, operator A UEs have been provisioned by operator A also for N ACDC categories as follows.

TABLE 2

| Operator A ACDC Category | Applications | Notes |
| --- | --- | --- |
| 1 | Text-based human generated messaging services | Includes SMS and all forms of IP-based Instant Messaging services entailing contact lists, whether they are user-defined or downloadable from server. |
| 2 | Human-generated Multimedia Messaging Services; Certain vital M2M services | |
| 3 | Highly delay tolerant TCP-based data services; Remaining M2M services | |
| 4 | Adaptive video streaming services | |
| ... | ... | |
| N | All remaining services | |

Operators A and Z both support ACDC. Operator A's policy is to honour ACDC categorization provisioned in roaming UEs.

Zbigniew is subscribed to operator Z.

Service Flows

Zbigniew is roaming on Operator A network with roaming data services enabled. A powerful earthquake takes place causing severe damage and other adverse effects in the city and surrounding area. Communication links are severely degraded, but there is still coverage in the area in the aftermath of the earthquake, though carrying capacity of the wireless network A is reduced.

As another consequence of the earthquake, intensity of both human and M2M communication rapidly increases, causing severe congestion in the wireless network A. In response to this situation, local radio access network A ACDC controls take effect, so that previously completely open access for all ACDC categories quickly turns into completely barred access for all but the highest ACDC category (1 in the tables above).

Post-Conditions

Thanks to the ACDC controls taking effect, network A congestion subsides, though only most critical ACDC category applications are allowed to access the network.

Zbigniew is unable to place a voice call to his family, due to classification to ACDC category 2, which is barred. However, Zbigniew is able to use DMB application classified in his UE as ACDC category 1, which is kept open by ACDC controls in this locality of network A.

Analogously, network A home users cannot use voice services or multimedia messages to reach their loved ones, as those services are in ACDC category 2, which is barred. However, they can use text messaging and IM, since those are category 1 services.

In summary, even though there is no direct compatibility of classification of applications into ACDC categories between networks A and Z, Zbigniew as a roaming user experiences network behaviour related to access controls of applications similar to what he would have experienced if he was not roaming. Hence, a sufficient degree of roaming compatibility is achieved, while allowing each operator A and Z to independently configure ACDC categories.

Potential Requirements

The potential requirements derived from this use case are:

There shall be a limited number of ACDC categories defined, which shall be ranked from highest (least likely to be barred) to lowest (most likely to be barred).

Provisioning of ACDC categories in the UEs is the responsibility of HPLMN operator, and does not require strict adherence to a globally prescribed ACDC categorization.

When ACDC controls are imposed, normally, the level of access restrictions (probability of denied or deferred access) for each higher ranked ACDC category is lower than for any lower ranked ACDC category. This is schematically illustrated in the following figure. Note however that this is only nominal behaviour (occurs in large majority of scenarios), from which the network operator is free to deviate if circumstances occasionally require.

FIG. 7 shows an example of an ACDC classes control hierarchy.

Referring to FIG. 7, it may be seen that as an ACDC category number (or value) becomes higher, it becomes closer to 'barred access' and as the ACDC category number becomes lower, it becomes closer to 'open access'.

An ACDC operation method according to each ACDC category, which is proposed by this specification, is described below.

Now, a single barring timer is used for ACDC handling in Radio Resource Control (RRC) of a UE.

That is, it is impossible to individually count the time when access is barred for each ACDC category because the ACDC categories use the single barring timer in common.

Accordingly, an ACDC overriding mechanism using a single barring timer is provided herein.

That is, the ACDC overriding mechanism proposed by this specification corresponds to a method for controlling the access of the UE for each ACDC category using the single barring timer.

FIG. 8 is a diagram showing an example of an ACDC handling method, which is proposed according to an embodiment of the present invention.

Specifically, FIG. 8*a* shows an overall operation method of UE performing ACDC handling, and FIG. 8*b* shows detailed procedures of a method 1 and method 2 in FIG. 8*a*.

Referring to FIG. 8, the UE receives system information, including Application Specific Congestion control for Data Communication (ACDC) barring information, from a network or an eNB (S801).

The UE performs a procedure for checking the received system information.

In this case, the system information may be a System Information Block (SIB) and may be an SIB 2, for example.

In this case, the ACDC barring information indicates information related to whether access to a specific ACDC category to which at least one application belongs will be permitted.

The ACDC barring information includes at least one of a barring rate parameter or a barring time parameter.

The barring rate parameter may mean ac-BarringFactor in Table 4 and Table 5 to be described later, and the barring time parameter may mean ac-BarringTime in Table 4 and Table 5.

That is, the barring rate parameter is a value compared with a random number selected by UE, and corresponds to a parameter by which access to a corresponding ACDC category is to be permitted.

The barring rate parameter has a value between 0 and 1, p00 may be indicative of a '0' value, p05 may be indicative of a '0.05' value, and p10 may be indicative of a '0.10' value.

Furthermore, the barring time parameter indicates a time value at which access is barred, and may be 4 seconds, 8 seconds, 16 seconds, 32 seconds, 64 seconds, 128 seconds, 256 seconds, or 512 seconds.

Thereafter, the UE checks whether RRC connection establishment with the eNB is required (S802).

Whether the RRC connection establishment is required may be determined based on whether a new packet to be transmitted to the eNB or to be received from the eNB is present.

In this case, it is assumed that an ACDC category number of a first access request for a RRC connection establishment is barred.

The ACDC category number of the first access request is also represented as a "category AA', for convenience of a description.

The category AA indicates an ACDC category number by which the barring timer is started or driven.

In this case, an ACDC category indicates a category to which an identified application(s) belong(s).

Table 3 is a table showing an example of ACDC category values (or numbers).

TABLE 3

| Value | Description |
|---|---|
| 0 | Reserved |
| 1 | Highest ranked ACDC category value |
| 2-15 | ACDC category value indicating descending order of ranking |
| 16 | Lowest ranked ACDC category value |

Referring to the table 3, the highest ranked ACDC category means the ACDC category with the lowest value and a UE treats applications assigned to the highest ranked ACDC category as the least restriction to access attempts.

The lowest ranked ACDC category means the ACDC category with the highest value and a UE treats applications assigned to the lowest ranked ACDC category as the most restriction to access attempts.

Thereafter, the UE performs the following procedure if RRC connection establishment with the eNB is required.

First, the UE checks the ACDC category number (or value) of an application that requests the RRC connection establishment (or a new RRC connection establishment) (S803).

The ACDC category number checked at step S803 is defined as an ACDC category of a second access request for the new RRC connection establishment, and is represented as a 'category K', for convenience of a description.

Thereafter, the UE checks whether an ACDC timer is running (S804).

That is, the UE checks whether access to a specific ACDC category is now barred.

The ACDC timer refers to a timer driven (or runned) when access to a specific ACDC category is barred, and may be represented as a barring timer.

If, as a result of the check, the ACDC timer is found to be driven (or runned), the UE compares a priority level of an ACDC category of the first access request with category priority level of an ACDC category of the second access request (S805).

That is, the UE compares the size of the category AA (i.e., the ACDC category number of the first access request) with the size of the category K (i.e., the ACDC category number of the second access request).

If, as a result of the comparison, the size of the category K is found to be equal to or greater than that of the category AA, the UE performs the following method 1 (S806) or method 2 (S807).

If the size of the category K is equal to or greater than that of the category AA, it means that the category K is not an ACDC category having higher priority than the category AA.

Accordingly, in this case, the UE maintains the timer that is being driven, and performs a reattempt (or a retry).

The retry is to perform S802~S805 again.

Method 1

The method 1 (S806) is first described. The UE selects a rand (or a random number) having a range of 0<=rand<1 (S806-1).

That is, the UE performs random draw for selecting a range of a corresponding range.

Thereafter, the UE calculates 'Tbarring' through Equation 1 below (S806-2).

$$\text{Tbarring} = (0.7 + 0.6 * \text{rand}) * ac\text{-BarringTime} \quad [\text{Math Figure 1}]$$

In Equation 1, the ac-BarringTime value is a value included in the aforementioned system information and may be obtained through the ac-BarringTime field of SIB 2.

Tbarring calculated by Equation 1 is a new barring time for all of current ACDC categories.

That is, the UE applies the newly calculated Tbarring to all the ACDC categories (S806-3).

All the (current) ACDC categories may mean the category AA that has driven the ACDC timer or barring timer and the category K, that is, a cause of the RRC connection establishment request.

In this case, Tbarring indicates the timer length of the barring timer or ACDC timer.

The timer length means the time during which the timer is driven.

Equation 1 is an example in which Tbarring is calculated. A common math figure for calculating the Tbarring may be defined as in Equation 2 below.

$$\text{Tbarring} = (a + (2*b) * \text{rand}) * ac\text{-BarringTime} \quad [\text{Math Figure 2}]$$

In Equation 2, a and b have a uniform distribution relation, that is, a relation of a+b=1.0.

Equation 1 indicates a math figure for calculating Tbarring if a=0.7 and b=0.3 in Equation 2.

Method 2

The method 2 (S807) is described below. If the category K is equal to or great than the category AA, the UE does not change the barring timer that is being driven, waits until the driving barring timer expires (S807-1), and makes a reattempt (S807-2).

Unlike in the method 1 and the method 2, if, as a result of the comparison at step S805, the category K is found to be smaller than the category AA, the UE performs the following procedure.

That is, this means that the category K has a higher category than the category AA.

First, the UE performs random draw on the barring probability (S808).

Thereafter, the UE checks whether a value selected through the random draw is smaller than a threshold included in the system information (S809).

In this case, the threshold included in the system information may be indicative of the ac-barring factor field included in SIB 2.

That is, the ac-BarringFactor field is information about whether access is to be permitted. The ac-BarringFactor field indicates that access is permitted if a random number selected by the UE is smaller than the ac-BarringFactor value and access is barred if not.

Thereafter, if, as a result of the check at step S809, the selected value is found to be smaller than the threshold, that is, if the access of the UE is permitted (or if ACDC is successful), the UE performs a random access procedure on the category K (S810).

In this case, the UE does not change an ongoing (or a running) timer.

For detailed contents of the random access procedure, reference is made to the random access procedure of FIG. 6.

In contrast, if, as a result of the check at step S809, the selected value is equal to or greater than the threshold, that is, if the access of the UE is barred (or if access to the category K is barred or if ACDC has failed), the UE makes a reattempt (S811).

Furthermore, if the RRC connection establishment is not required at step S802, the UE does not perform any ACDC operation.

Table 4 below shows an example of an SIB 2 information element.

Specifically, Table 4 shows a SystemInformationBlockType2 information element, which includes radio resource configuration information that is common to all UEs.

TABLE 4

```
-- ASN1START
SystemInformationBlockType2 ::=         SEQUENCE {
    ac-BarringInfo                      SEQUENCE {
        ac-BarringForEmergency              BOOLEAN,
        ac-BarringForMO-Signalling          AC-BarringConfig
OPTIONAL, -- Need OP
        ac-BarringForMO-Data            AC-BarringConfig               OPTIONAL
    }                                                                  OPTIONAL, --
Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA
OPTIONAL, -- Need OP
        ul-Bandwidth                    ENUMERATED {n6, n15, n25, n50, n75,
n100}
                                                                       OPTIONAL, --
Need OP
        additionalSpectrumEmission          AdditionalSpectrumEmission
    },
    mbsfn-SubframeConfigList            MBSFN-SubframeConfigList
OPTIONAL,  -- Need OR
    timeAlignmentTimerCommon            TimeAlignmentTimer,
    ...,
    lateNonCriticalExtension        OCTET STRING (CONTAINING
SystemInformationBlockType2-v8h0-IEs)                   OPTIONAL,
    [[ ssac-BarringForMMTEL-Voice-r9        AC-BarringConfig
OPTIONAL, -- Need OP
        ssac-BarringForMMTEL-Video-r9       AC-BarringConfig
OPTIONAL -- Need OP
    ]],
    [[ ac-BarringForCSFB-r10            AC-BarringConfig               OPTIONAL -
- Need OP
    ]],
    [[ ac-BarringSkipForMMTELVoice-r12  ENUMERATED {true}
OPTIONAL, -- Need OP
        ac-BarringSkipForMMTELVideo-r12     ENUMERATED {true}
OPTIONAL, -- Need OP
        ac-BarringSkipForSMS-r12        ENUMERATED {true}              OPTIONAL,
-- Need OP
        ac-BarringPerPLMN-List-r12          AC-BarringPerPLMN-List-r12
OPTIONAL -- Need OP
    ]],
    [[ voiceServiceCauseIndication-r12      ENUMERATED {true}          OPTIONAL
    ]],
    [[ acdc-BarringForCommon-r13        ACDC-BarringForCommon-r13
OPTIONAL, -- Need OP
        acdc-BarringPerPLMN-List-r13        ACDC-BarringPerPLMN-List-r13   OPTIONAL
    ]]
}
SystemInformationBlockType2-v8h0-IEs ::= SEQUENCE {
    multiBandInfoList               SEQUENCE (SIZE (1..maxMultiBands)) OF
AdditionalSpectrumEmission    OPTIONAL, -- Need OR
    nonCriticalExtension            SystemInformationBlockType2-v9e0-IEs
OPTIONAL
}
SystemInformationBlockType2-v9e0-IEs ::= SEQUENCE {
    ul-CarrierFreq-v9e0             ARFCN-ValueEUTRA-v9e0          OPTIONAL, --
Cond ul-FreqMax
    nonCriticalExtension            SEQUENCE { }                   OPTIONAL
}
AC-BarringConfig ::=                SEQUENCE {
    ac-BarringFactor                    ENUMERATED {
                                        p00, p05, p10, p15, p20, p25, p30, p40,
                                        p50, p60, p70, p75, p80, p85, p90, p95},
    ac-BarringTime                  ENUMERATED {s4, s8, s16, s32, s64, s128,
s256, s512},
    ac-BarringForSpecialAC          BIT STRING (SIZE (5) )
}
MBSFN-SubframeConfigList ::=        SEQUENCE (SIZE (1..maxMBSFN-
Allocations)) OF MBSFN-SubframeConfig
AC-BarringPerPLMN-List-r12 ::=      SEQUENCE (SIZE (1.. maxPLMN-r11)) OF AC-
BarringPerPLMN-r12
AC-BarringPerPLMN-r12 ::=           SEQUENCE {
    plmn-IdentityIndex-r12              INTEGER (1..maxPLMN-r11),
    ac-BarringInfo-r12                  SEQUENCE {
        ac-BarringForEmergency-r12          BOOLEAN,
        ac-BarringForMO-Signalling-r12      AC-BarringConfig           OPTIONAL, --
Need OP
        ac-BarringForMO-Data-r12        AC-BarringConfig               OPTIONAL -- Need
```

TABLE 4-continued

```
OP
    }                                      OPTIONAL, -- Need OP
    ac-BarringSkipForMMTELVoice-r12    ENUMERATED {true}       OPTIONAL, --
Need OP
    ac-BarringSkipForMMTELVideo-r12    ENUMERATED {true}       OPTIONAL, --
Need OP
    ac-BarringSkipForSMS-r12           ENUMERATED {true}       OPTIONAL, -- Need
OP
    ac-BarringForCSFB-r12              AC-BarringConfig        OPTIONAL, -- Need
OP
    ssac-BarringForMMTEL-Voice-r12     AC-BarringConfig        OPTIONAL, --
Need OP
    ssac-BarringForMMTEL-Video-r12     AC-BarringConfig        OPTIONAL --
Need OP
}
ACDC-BarringForCommon-r13 ::=          SEQUENCE {
    acdc-HPLMNonly-r13                 BOOLEAN,
    barringPerACDC-CategoryList-r13            BarringPerACDC-CategoryList-
r13
}
ACDC-BarringPerPLMN-List-r13 ::=       SEQUENCE (SIZE (1.. maxPLMN-r11)) OF
ACDC-BarringPerPLMN-r13
ACDC-BarringPerPLMN-r13 ::=            SEQUENCE {
    plmn-IdentityIndex-r13             INTEGER (1..maxPLMN-r11),
    acdc-OnlyForHPLMN-r13              BOOLEAN,
    barringPerACDC-CategoryList-r13            BarringPerACDC-CategoryList-
r13
}
BarringPerACDC-CategoryList-r13 ::= SEQUENCE (SIZE (1..maxACDC-Cat-r13)) OF
BarringPerACDC-Category-r13
BarringPerACDC-Category-r13 ::=    SEQUENCE {
    acdc-Category-r13              INTEGER (1..maxACDC-Cat-r13),
    acdc-BarringConfig-r13         SEQUENCE {
        ac-BarringFactor-r13           ENUMERATED {
                                       p00, p05, p10, p15, p20, p25, p30, p40,
                                       p50, p60, p70, p75, p80, p85, p90, p95},
        ac-BarringTime-r13             ENUMERATED {s4, s8, s16, s32, s64, s128,
s256, s512}
    }                              OPTIONAL -- Need OP
}
-- ASN1STOP
```

Table 5 below is a table showing a detailed description of the fields listed in Table 4.

TABLE 5

| SystemInformationBlockType2 field descriptions |
|---|
| ac-BarringFactor |
| If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0. |
| ac-BarringForCSFB |
| Access class barring for mobile originating CS fallback. |
| ac-BarringForEmergency |
| Access class barring for AC 10. |
| ac-BarringForMO-Data |
| Access class barring for mobile originating calls. |
| ac-BarringForMO-Signalling |
| Access class barring for mobile originating signalling. |
| ac-BarringForSpecialAC |
| Access class barring for AC 11-15. The first/leftmost bit is for AC 11, the second bit is for AC 12, and so on. |
| ac-BarringTime |
| Mean access barring time value in seconds. |
| acdc-BarringConfig |
| Barring configuration for an ACDC category. If the field is absent, access to the cell is considered as not barred for the ACDC category in accordance with subclause 5.3.3.13. |
| acdc-Category |
| Indicates the ACDC category as defined in TS 24.105 [72]. |
| acdc-OnlyForHPLMN |
| Indicates whether ACDC is applicable for UEs not in their HPLMN for the corresponding PLMN. TRUE indicates that ACDC is applicable only for UEs in their HPLMN for the corresponding PLMN. FALSE indicates that ACDC is applicable for both UEs in their HPLMN and UEs not in their HPLMN for the corresponding PLMN. |
| additionalSpectrumEmission |
| The UE requirements related to IE AdditionalSpectrumEmission are defined in TS 36.101 [42, table 6.2.4.1]. NOTE 1. |
| barringPerACDC-CategoryList |
| A list of barring information per ACDC category according to the order defined in TS 22.011 [10]. The first entry in the list corresponds to the highest ACDC category of which applications are the least restricted in access attempts at a cell, the second entry in the list corresponds to the ACDC category of which applications are restricted more than applications of the highest ACDC category in access attempts at a cell, and so on. The last |

TABLE 5-continued

SystemInformationBlockType2 field descriptions entry in the list corresponds to the lowest ACDC category of
which applications are the most restricted in access attempts at
a cell.
mbsfn-SubframeConfigList Defines the subframes that are reserved for MBSFN in downlink.
NOTE 1.
multiBandInfoList A list of additionalSpectrumEmission i.e. one for each additional
frequency band included in multiBandInfoList in
SystemInformationBlockType1, listed in the same order.
plmn-IdentityIndex Index of the PLMN in plmn-IdentityList included in SIB1. Value 1
indicates the PLMN listed 1st in plmn-IdentityList included in
SIB1. Value 2 indicates the PLMN listed 2nd in plmn-IdentityList
included in SIB1 and so on. NOTE 1.
ssac-BarringForMMTEL-Video Service specific access class barring for MMTEL video originating
calls.
ssac-BarringForMMTEL-Voice Service specific access class barring for MMTEL voice originating
calls.
ul-Bandwidth Parameter: transmission bandwidth configuration, NRB, in uplink,
see TS 36.101 [42, table 5.6-1]. Value n6 corresponds to 6
resource blocks, nl5 to 15 resource blocks and so on. If for FDD
this parameter is absent, the uplink bandwidth is equal to the
downlink bandwidth. For TDD this parameter is absent and it is
equal to the downlink bandwidth. NOTE 1.
ul-CarrierFreq For FDD: If absent, the (default) value determined from the
default TX-RX frequency separation defined in TS 36.101 [42,
table 5.7.3-1] applies.
For TDD: This parameter is absent and it is equal to the downlink
frequency. NOTE 1.
voiceServiceCauseIndication Indicates whether UE is requested to use the establishment cause
mo-VoiceCall for mobile originating MMTEL voice calls.

FIG. 9 is a diagram showing another example of an ACDC handling method, which is proposed according to an embodiment of the present invention.

Referring to the FIG. 9, the terminal receives, from a base station, system information comprising Application specific Congestion control for Data Communication (ACDC) barring information (S910).

The ACDC barring information is information related to whether or not to allow an access of a specific ACDC category to which at least one application belongs.

Also, the ACDC barring information comprises at least one of a barring rate parameter or a barring time parameter.

Also, the system information can be a System Information Block (SIB) 2.

Here, it is assumed that an ACDC category number of a first access request for a RRC connection establishment is barred.

In this case, the terminal stores the ACDC category number (or a priority level of an ACDC category) of the first access request (S920).

The first access request is an access request that caused an ACDC timer to be triggered when the ACDC timer begins to run. Thereafter, the terminal checks whether there is a need of a second access request (S930).

The second access request is an access request for establishing a new RRC(Radio Resource Control) connection caused by a specific application.

Additionally, the terminal can check the second ACDC category (number or value) if there is the need of RRC connection establishment.

Thereafter, the terminal checks whether an ACDC timer is running (S940).

Thereafter, the terminal compares the priority level of the ACDC category of the first access request with a priority level of an ACDC category of the second access request if the ACDC timer is running due to the stored priority level that caused the ACDC timer to start (S950).

Here, the priority level of the ACDC category of the first access request indicates an ACDC category number which has caused the ACDC timer to start.

Also, the priority level of the ACDC category of the second access request indicates an ACDC category number related to the second access request.

Thereafter, the terminal determines, based on the comparison result, whether the terminal performs a random access procedure for establishing the new RRC connection (S960).

Step 960 is described in detail below.

That is, if the priority level of the ACDC category of the second access request is higher than the priority level of the ACDC category of the first access request, the terminal performs random draw for barring probability.

Thereafter, the terminal compares the drawn value and the barring rate parameter included in the ACDC barring information.

Here, if the drawn random value is smaller than the barring rate parameter value, the terminal performs a random access procedure with the base station.

On the other hand, if the randomly drawn value is a larger than the barring rate parameter value, the terminal cannot perform a random access procedure with the base station.

That is, the access of the terminal is barred if the drawn random value is a larger than the barring rate parameter value.

In this case (if the drawn random value is a larger than the barring rate parameter value), the terminal renews the ACDC timer with a new barring time, or waits until the ACDC timer expires.

The new barring time is determined by the above equation 1. On the other hand, if the priority level of the ACDC category of the second access request is lower than the priority level of the ACDC category of the first access request, the terminal waits until the ACDC timer expires, or renews the ACDC timer.

Here, the new barring time is applied to the first access request and the second access request.

General Apparatus to which an Embodiment of the Present Invention May be Applied FIG. 10 is a block diagram illustrating a wireless device in which methods as proposed herein may be implemented.

Here, the wireless device may be a base station and a UE, and the base station includes both a macro base station and a small base station.

As shown in FIG. 10, the base station 1010 and the UE 1020 include communication units (transmitting/receiving units, RF units, 1013 and 1023), processors 1011 and 1021, and memories 1012 and 1022.

The base station and the UE may further input units and output units.

The communication units 1013 and 1023, the processors 1011 and 1021, the input units, the output units, and the memories 1012 and 1022 are operatively connected with each other in order to conduct the methods as proposed herein.

The communication units (transmitting/receiving units or RF units, 1013 and 1023), when receiving information created from a Physical Layer (PHY) protocol, transfer the received information through Radio Frequency (RF) spectrums and conduct filtering and amplification, then transmit the results through antennas. Further, the communication units transfer Radio Frequency (RF) signals received through the antennas to bands processable by the PHY protocol and perform filtering.

However, the communication units may also include the functions of switches to switch transmitting and receiving functions.

The processors 1011 and 1021 implement functions, procedures, and/or methods as proposed herein. The layers of radio interface protocols may be implemented by the processors.

The processors may be represented as control parts, controllers, control units, or computers.

That is, the processor is characterized to control sending to the second base station a small cell addition request message to request that the second base station assign a radio resource for a specific E-RAB (E-UTRAN Radio Access Bearer), receiving from the second base station an ACK responsive to the small cell addition request message, sending to the terminal an RRC reconfiguration message so that the terminal applies new radio resource configuration, receiving from the terminal an RRC reconfiguration complete message informing that the terminal's radio resource reconfiguration has been complete, and sending to the second base station an RRC configuration complete message to inform that the terminal's radio resource reconfiguration has been successfully complete.

Further, the processor is characterized to control receiving from the first base station a small cell addition request message for requesting that the second base station assign a radio resource for a specific E-UTRAN Radio Access Bearer (E-RAB), assigning a radio resource for the specific E-RAB based on the received small cell addition request message, sending to the first base station an ACK responsive to the small cell addition request message, and receiving from the first base station an RRC configuration complete message to inform that the terminal's radio resource reconfiguration has been successfully complete.

The memories 1012 and 1022 are connected with the processors to store protocols or parameters for performing the small cell addition procedure.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the small cell addition procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Further, the recording media readable by the processor may be distributed to computer systems connected with each other via a network, and processor readable codes may be stored and executed in a distributing manner.

This disclosure lies in utilizing a small cell addition procedure in a heterogeneous network.

INDUSTRIAL APPLICABILITY

Examples in which a method for controlling an access of a terminal in a wireless communication system according to an embodiment of the present invention has been applied to a 3GPP LTE/LTE-A system have been described, but the method may be applied to various wireless communication systems in addition to the 3GPP LTE/LTE-A system.

The invention claimed is:

1. A method for controlling, by a terminal, access to a base station in a wireless communication system, the method comprising:

receiving, from the base station, system information including Application specific Congestion control for Data Communication (ACDC) barring information which relates to whether an application belonging to a specific ACDC category of applications is allowed to access the base station;

identifying whether an ACDC timer is running, wherein the ACDC timer is a single barring timer which is commonly used for individual ACDC categories and the single barring timer is running when an access of an application belonging to one of the ACDC categories is being barred;

storing a priority level of an ACDC category which causes the ACDC timer to be triggered to run when the ACDC timer is running, wherein the stored priority level is a priority level of an ACDC category of a first access request;

comparing the priority level of the ACDC category of the first access request with a priority level of an ACDC category of a second access request when the ACDC timer is running; and performing a procedure for the second access request by i) applying a random value of barring probability or ii) the ACDC timer, based on a result of the comparison, wherein the procedure is performed when the ACDC timer is running.

2. The method of claim 1, wherein the second access request is an access request for establishing a RRC (Radio Resource Control) connection caused by a specific application.

3. The method of claim 2, wherein the priority level of the ACDC category of the first access request indicates an ACDC category number which has caused the ACDC timer to start, and the priority level of the ACDC category of the second access request indicates an ACDC category number related to the second access request.

4. The method of claim 3, wherein the ACDC barring information comprises at least one of a barring rate parameter or a barring time parameter.

5. The method of claim 4, wherein when the priority level of the ACDC category of the second access request is higher than the priority level of the ACDC category of the first access request, the procedure comprises:
performing random draw for the barring probability; and
comparing the drawn value with the barring rate parameter included in the ACDC barring information.

6. The method of claim 5, wherein the procedure further comprising:
performing a random access procedure with the base station if the drawn random value is smaller than the barring rate parameter value.

7. The method of claim 5, wherein the access of the terminal is barred if the randomly drawn value is larger than the barring rate parameter value.

8. The method of claim 7, wherein the procedure further comprising:
renewing the ACDC timer with a new barring time, or waiting until the ACDC timer expires.

9. The method of claim 8, wherein the new barring time is determined by the following equation, $$Tbarring = (0.7 + 0.6*rand)*ac\text{-}BarringTime, \quad [\text{Equation}]$$

wherein Tbarring is the new barring time, rand is a random number which has a range of 0<rand<1 and ac-BarringTime is a time value of the barring time parameter.

10. The method of claim 8, wherein the new barring time is applied to the first access request and the second access request.

11. The method of claim 5, wherein when the priority level of the ACDC category of the second access request is lower than the priority level of the ACDC category of the first access request, the procedure comprises:
waiting until the ACDC timer expires or
renewing the ACDC timer.

12. The method of claim 3, wherein the system information is a System Information Block (SIB) 2.

13. A terminal for controlling access in a wireless communication system, comprising:
a transceiver; and
a processor functionally connected to the transceiver,
wherein the processor is configured to:
control the transceiver to receive, from a base station, system information including Application specific Congestion control for Data Communication (ACDC) barring information which relates to whether an application belonging to a specific ACDC category applications is allowed to access the base station;
identify whether an ACDC timer is running, wherein the ACDC timer is a single barring timer which is commonly used for individual ACDC categories and the single barring timer is running when an access of an application belonging to one of the ACDC categories is being barred;
store a priority level of an ACDC category which causes the ACDC timer to be triggered to run when the ACDC timer is running, wherein the stored priority level is a priority level of an ACDC category of a first access request;
compare the priority level of the ACDC category of the first access request with a priority level of an ACDC category of a second access request when the ACDC timer is running; and
performing a procedure for the second access request by i) applying a random value of barring probability or ii) the ACDC timer, based on a result of the comparison, wherein the procedure is performed when the ACDC timer is running.

14. The terminal of claim 13, wherein the second access request is an access request for establishing a RRC (Radio Resource Control) connection caused by a specific application.

15. The method of claim 14, wherein the priority level of the ACDC category of the first access request indicates an ACDC category number which has caused the ACDC timer to start, and the priority level of the ACDC category of the second access request indicates an ACDC category number related to the second access request.

* * * * *